(12) United States Patent
Weilhammer et al.

(10) Patent No.: US 10,035,188 B2
(45) Date of Patent: Jul. 31, 2018

(54) METHOD FOR PRODUCING A THREE-DIMENSIONAL OBJECT

(71) Applicant: EOS GmbH Electro Optical Systems, Krailling (DE)

(72) Inventors: Joseph Weilhammer, Inning (DE); Ludger Hummeler, Lennestadt (DE); Juha Kotila, Turku (FI)

(73) Assignee: EOS GmbH Electro Optical Systems, Krailling (DE)

( * ) Notice: Subject to any disclaimer, the term of this patent is extended or adjusted under 35 U.S.C. 154(b) by 391 days.

(21) Appl. No.: 14/897,064

(22) PCT Filed: Jun. 30, 2014

(86) PCT No.: PCT/EP2014/063864
§ 371 (c)(1),
(2) Date: Dec. 9, 2015

(87) PCT Pub. No.: WO2015/000854
PCT Pub. Date: Jan. 8, 2015

(65) Prior Publication Data
US 2016/0167131 A1     Jun. 16, 2016

(30) Foreign Application Priority Data
Jul. 1, 2013 (DE) .......................... 10 2013 212 803

(51) Int. Cl.
*B22F 3/105* (2006.01)
*G05B 19/4099* (2006.01)
(Continued)

(52) U.S. Cl.
CPC ............ *B22F 3/1055* (2013.01); *B28B 1/001* (2013.01); *B28B 17/0081* (2013.01);
(Continued)

(58) Field of Classification Search
CPC ............................... B22F 3/1055; B33Y 10/00
(Continued)

(56) References Cited

U.S. PATENT DOCUMENTS 5,932,059 A    8/1999  Langer et al.
6,505,089 B1   1/2003  Yang et al.
(Continued)

FOREIGN PATENT DOCUMENTS

CN    1519759 A    8/2004
CN    1726108 A    1/2006
(Continued)

OTHER PUBLICATIONS

PCT International Search Report and Written Opinion, dated Jan. 5, 2016; 8 pages.

*Primary Examiner* — Weiping Zhu
(74) *Attorney, Agent, or Firm* — Seyfarth Shaw LLP

(57) ABSTRACT

The invention relates to a method for layered production of a three-dimensional object, wherein a powdery or fluid building material, which can be solidified by the effects of electromagnetic or particle radiation, is applied in layers having a layer thickness d, and the locations in each layer which correspond to a cross-section of the object allocated to said layer are solidified by means of electromagnetic or particle radiation. According to the invention, each cross-section consists of a contour region and an inner region and the method comprises the following sub-step: in a sequence of N successive cross-sections, wherein N is a whole number greater than 1, a partial region is defined in every cross-section as a critical region and the rest of the cross-section is defined as a non-critical region, a number of N layers are applied successively, without solidification of the non-critical regions. The non-critical regions of all N layers are not solidified in all N layers until after application of the Nth layer.

12 Claims, 3 Drawing Sheets

Figure 1:
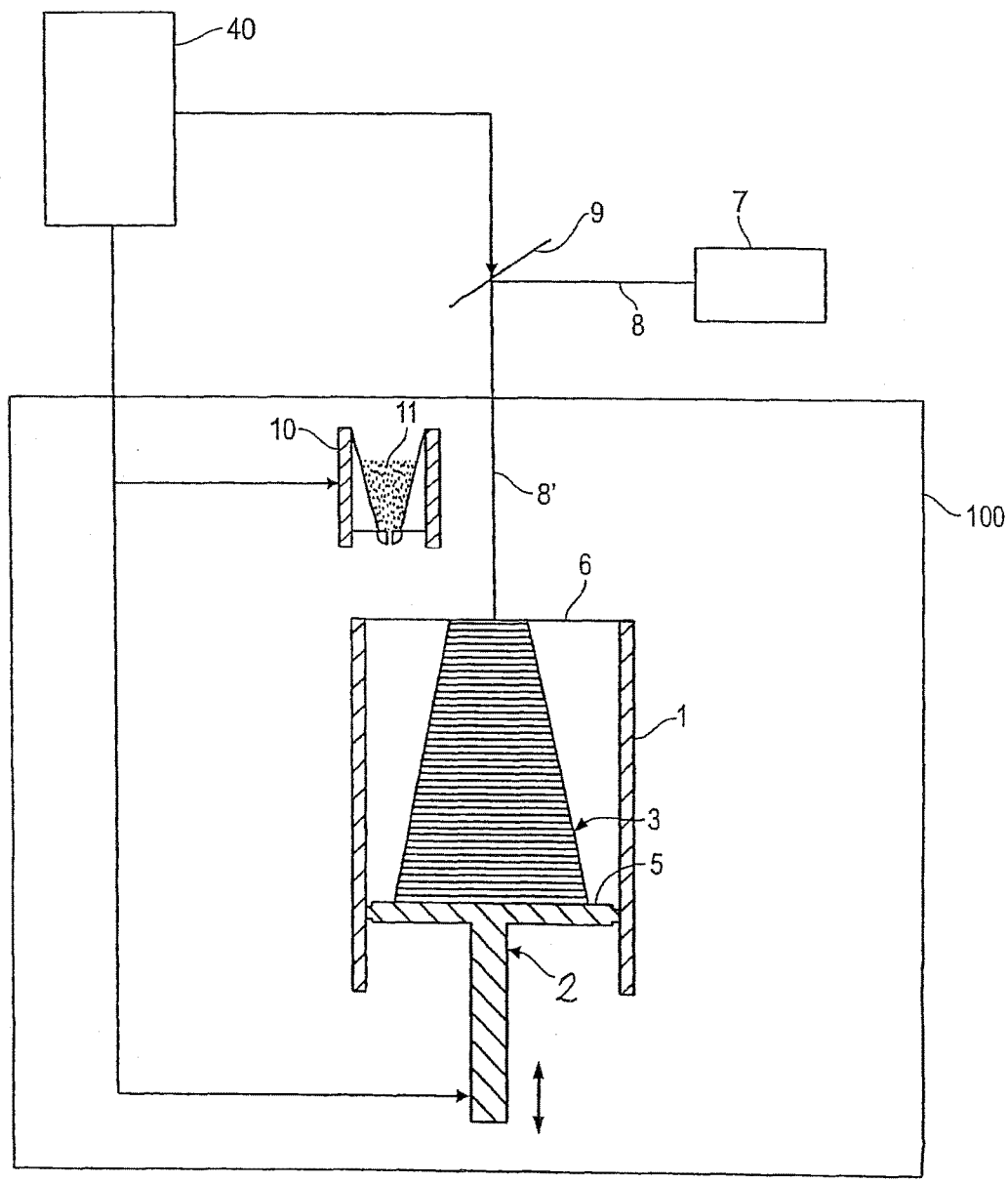

(51) Int. Cl.
 _B28B 1/00_ (2006.01)
 _B28B 17/00_ (2006.01)
 _B29C 67/00_ (2017.01)
 _B33Y 10/00_ (2015.01)
 _B33Y 50/02_ (2015.01)
 _B29K 105/00_ (2006.01)

(52) U.S. Cl.
 CPC ...... _B29C 67/0062_ (2013.01); _B29C 67/0077_ (2013.01); _B29C 67/0088_ (2013.01); _G05B 19/4099_ (2013.01); _B22F 2003/1057_ (2013.01); _B29K 2105/0058_ (2013.01); _B29K 2105/251_ (2013.01); _B33Y 10/00_ (2014.12); _B33Y 50/02_ (2014.12); _G05B 2219/35134_ (2013.01); _G05B 2219/49007_ (2013.01); _G05B 2219/49013_ (2013.01); _G05B 2219/49018_ (2013.01)

(58) Field of Classification Search
 USPC .......................................................... 264/497
 See application file for complete search history.

(56) References Cited

U.S. PATENT DOCUMENTS

| | | |
|---|---|---|
| 2004/0153192 A1 | 8/2004 | Ikeda et al. |
| 2006/0145381 A1 | 7/2006 | Larsson |
| 2010/0270713 A1 | 10/2010 | Frangov et al. |
| 2014/0010908 A1 | 1/2014 | Matsumoto et al. |

FOREIGN PATENT DOCUMENTS

| | | |
|---|---|---|
| CN | 102076483 A | 5/2011 |
| DE | 4309524 C1 | 11/1993 |
| DE | 19727934 A1 | 1/1999 |
| DE | 112012001280 T5 | 3/2014 |
| WO | 2012124828 A1 | 9/2012 |

METHOD FOR PRODUCING A THREE-DIMENSIONAL OBJECT

The invention is related to a method for a layer-wise manufacture of a three-dimensional object in accordance with the preamble of claim 1. In particular, the invention is related to a method for laser sintering parts.

More and more, additive manufacturing methods are used not only for the manufacture of prototypes or small series. Rather, the trend goes to a volume production of fully functional parts by means of layer-wise manufacturing methods. A very important aspect in the volume production is the manufacturing time. However, usually a manufacturing time that is as short as possible is in contradiction to the creation of object details that are as small as possible. In a layer-wise manufacturing method such contradiction immediately appears in the construction parameters:

For example, if in laser sintering a large laser beam focus is chosen for the irradiation in order to solidify the building material, this will shorten the manufacturing process. However, a large focus will reduce the achievable accuracy of details at the object to be manufactured. Also the thickness of the building material layers to be applied in the layer-wise construction process in the end is a compromise between a manufacturing time and an accuracy of details. In case a large layer thickness is chosen, the total number of layers will be smaller. However, as a result the accuracy of details is lowered, which first of all can be seen at part surfaces that are tilted with respect to the vertical: The larger the layer thickness, the lower will be the perfection by which a tilted surface is created. The tilted surface has a step profile that will be the coarser the larger the layer thickness.

DE 43 09 524 C1 proposes a method, in which the surface regions of an object are solidified by means of a laser beam having a small diameter, while the inner region of the object is solidified by means of a laser beam having a large diameter. For this, after the application of a building material layer having a predetermined thickness, only that part of the layer is solidified that corresponds to the surface of the object, while no solidification of the inner region occurs. Only after the application of N layers, with N being an integer larger than 1, the inner region of all N layers is solidified at once by means of a laser beam having a large diameter.

The method according to DE 43 09 524 C1 has disadvantages in particular for complex parts with surfaces of complex design, because a complex surface leads to an expanded boundary line per object cross-section and thus leads to a long-lasting solidification of such boundary line per layer.

DE 197 27 934 A1 describes an alternative approach to the optimization of the trade-off between manufacturing time and accuracy of details. The document suggests dividing the part interactively into segments after an analysis of the part and specifying the thickness of the part layers for the individual segments separately. Thereby, individual small layer thicknesses may be assigned to critical regions such as thin webs, whereas thicker layers are assigned to other regions such as walls of the part that are perpendicular to the layers. All in all this aims at a reduction of the manufacturing time.

The method of DE 197 27 934 A1 in particular refrains from stringently choosing a constant layer thickness for the whole object cross-section. A small layer thickness is selected only in segments to which critical regions are assigned. Such an approach is advantageous in particular in laminated object manufacturing, where paper layers are glued onto one another. In stereolithography and in laser sintering, however, such an approach meets a problem: It is difficult to apply a thin building material layer only in a partial region of the construction space assigned to a segment and to apply no building material in other partial regions of the construction space.

Therefore, the object of the present invention is to provide a method for a layer-wise manufacturing of a three-dimensional object by means of a solidification by electromagnetic radiation or energetic particle radiation, in which method a trade-off between manufacturing time and accuracy of details has been optimized also for the manufacturing of objects, in which the necessary accuracy of details varies substantially within the object.

The object is achieved by a method according to claim 1.

Further developments of the invention are specified in the dependent claims.

According to the invention, no static difference like in DE 43 09 524 C1 is made between an inner region of an object cross-section and a contour region of the same, when the building material is solidified. Differing from the approach in DE 197 27 934 A1, according to the invention for a further optimization of the trade-off between manufacturing time and accuracy of details there is no adaptation of the layer thicknesses. Rather, the irradiation parameters for a solidification of the building material are adapted. In particular, regions, in which a high accuracy of details is necessary, are solidified differently from regions, in which a smaller accuracy of details is sufficient.

Further features and advantages of the invention result from the description of embodiments on the basis of the figures, wherein the same do show:

FIG. 1 a schematic representation of a laser sintering device as example of a device for a layer-wise manufacturing of a three-dimensional object.

Figure 2:
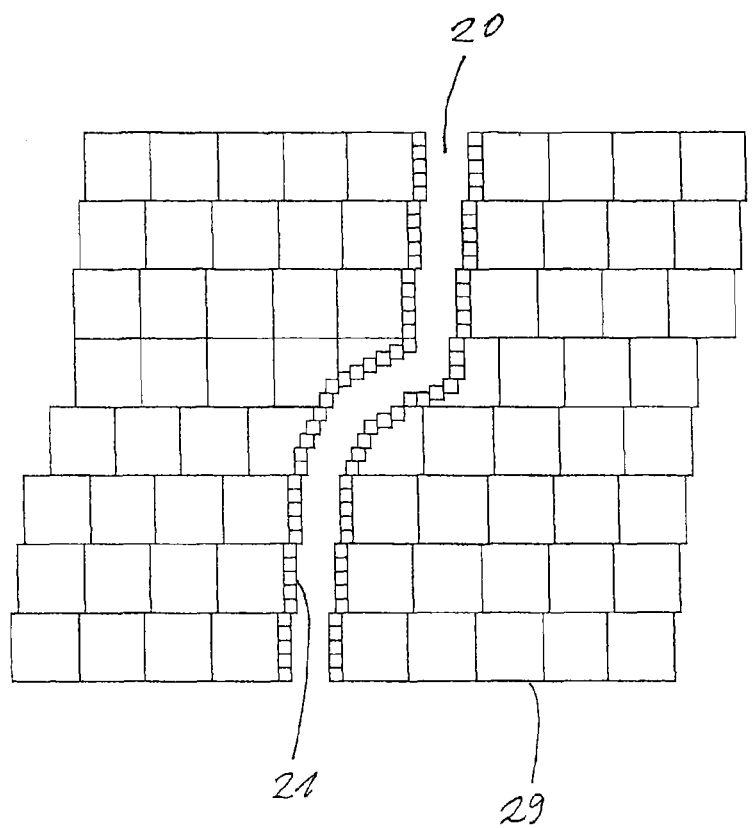
Figure 3:
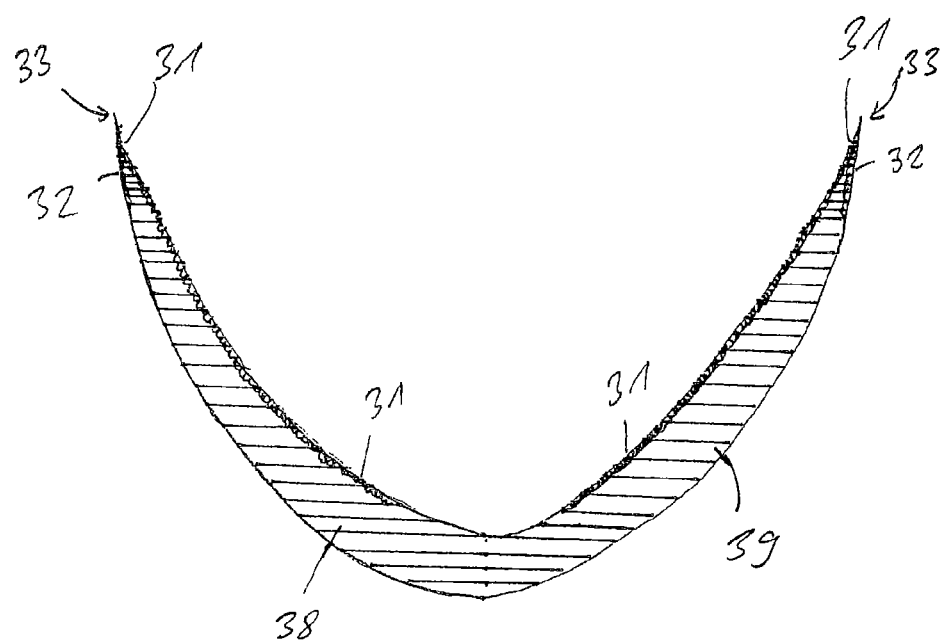

FIG. 2 a section through a partial region of an object to be manufactured in accordance with a first embodiment of the present invention, wherein the section is perpendicular to the layers, and FIG. 3 a section through an object to be manufactured in accordance with a second embodiment of the invention, the section being perpendicular to the applied layers.

FIG. 1 schematically shows a laser sintering device as an example of a device for a layer-wise manufacturing of a three-dimensional object by means of an additive manufacturing method. The device, in which after an adaptation of the control unit the method according to the invention can be carried out, comprises a container 1 that is open to the top with a support 2 that can be moved therein in a vertical direction, which support supports the object to be formed. The support 2 is positioned in a vertical direction such that the respective layer of the object that is to be solidified lies in a working plane 6. Furthermore, an application device 10, 11 is provided for applying the building material in powder form that is to be solidified by electromagnetic radiation. A laser 7 is provided as source of the electromagnetic radiation. The laser beam 8 generated by the laser 7 is directed into the process chamber 100 by a deflection unit 9 and is focused at a predetermined point in the working plane 6. Moreover, a control unit 40 is provided, which control unit controls the components of the device in a coordinated way for carrying out the building process. The control is carried out in dependence of CAD data of the object to be manufactured.

All powders and powder mixtures, respectively, that are suitable for a laser sintering process, may be used as building material in powder form. Such powders include e.g.

plastic powders such as polyamide or polystyrene, PEEK, metal powders such as stainless steel powder or other metal powders adapted to the respective purpose, in particular alloys, plastic-coated sand or ceramics powder.

Usually, the laser sintering device is operated such that the application device 10, 11 moves across the construction field and applies a powder layer having a predetermined thickness d, which thickness need not be the same for all layers, in the whole construction field. Subsequently, the cross-section of the object 3 in the respective layer is irradiated with the laser beam in the working plane 6 and the powder there is solidified. Then the support 2 is lowered and a new powder layer is applied. In this way the object is manufactured layer by layer. After the completion of the object, the same is removed and if necessary is after-treated by e.g. milling and/or is subjected to a quality control.

Within an object cross-section 13 one can distinguish between a contour region and an inner region. Here, the contour region corresponds to the boundary region (boundary in the mathematical-topological sense) of the object, whereas the inner region is the cross-sectional area less the contour region. Then, in the completed object the contour region is at the outer surface or even also at the inner surface (if cavities and channels, respectively, are present).

In the following it is described, how a method according to the invention may be carried out on the just-described laser sintering device, wherein only the particularities as compared to the usual procedure are described:

In an additive manufacturing method such as a laser sintering method, in which objects are manufactured layer-wise from a building material, at first a CAD model of the object to be manufactured exists. Such CAD model is cut into layers (so-called slicing) that correspond to the layers of the building material to be solidified. These data (also called "production data"), which contain the structure information on the object, are processed by the control unit 40 for the manufacturing of the object. According to the invention, the original CAD model of the object is divided (split) into model subregions before the dissection into layers (slicing). Thus, after the slicing at least in some of the layers there exist regions that are assigned to different model subregions.

Then, in the subsequent manufacturing of the object based on the production data, the building material in one layer in different model subregions is solidified differently. Usually, by the splitting-up it is possible to provide for a time-consuming solidification with high accuracy of details only in such model subregions, in which it is necessary due to the object geometry, the intended use of the object or the boundary conditions given by the manufacturing process. Nevertheless, a layer with constant thickness is applied in the whole construction region. A distinction with regard to the different model subregions is made by the solidification parameters.

Usually it is sufficient that an object is split up into two model subregions: one model subregion to be solidified with high accuracy of details and another model subregion that can be solidified with a lower accuracy of details (and thus can be solidified faster). However, nevertheless one can use a more detailed differentiation in the solidification conditions by providing more than two model subregions. In the following in order to illustrate the approach according to the invention a distinction is made between a so-called critical region and a so-called non-critical region, i.e. between two model subregions into which the three-dimensional CAD model has been split.

FIG. 2 shows a schematic cross-section of a subregion of an object that has been manufactured according to a first embodiment of the present invention, wherein the section runs perpendicular to the powder layers, from which the object was manufactured. Ideally, the layering in the building process is no longer recognizable at the completed object. However, in order to illustrate the method according to the invention, in FIG. 2 the object is shown such that the individual solidification regions (represented quadratically) can be seen, which solidification regions are the result of the action of for example a laser beam on these areas of the powder.

The completed object shown in FIG. 2 features an inside cooling channel 20 that has a strong curvature. Due to the curvature and due to the small diameter it is necessary to manufacture the wall regions 21 of the cooling channel with high accuracy of details. In contrast thereto, the remaining region of an object cross-section has only very few details, so that in this region a coarser construction is also possible. Therefore, the original CAD model is split into a region that corresponds to the wall region 21 as critical region (first model subregion) and a non-critical region (second model subregion) 29 that includes the whole remaining volume of the object.

Now, the building process is, for example, carried out such that the building material is applied layer by layer with a small thickness d (for example 40 µm), wherein the thickness is chosen such that a solidification with high precision can be carried out in the wall region 21 of the cooling channel. The surface region 21, which is considered to be particularly critical with respect to the accuracy of details, now is solidified in each layer after the application of this layer, while the rest of the applied layer is not solidified at first. Only after a certain number N of layers, N being an integer larger than 1, has been applied, the non-critical region of an object cross-section is solidified in such a way that the building material in all N layers is simultaneously solidified. The solidification of the non-critical region can for example be effected by making the laser beam focus larger and/or by increasing the laser power.

According to the invention, within an object cross-section no distinction is made, whether a subregion to be solidified is located inside of the cross-section or is located at its boundary. Rather, a distinction is made between particularly critical boundary regions within a cross-section and the rest of the cross-section, wherein the rest may comprise inner regions and boundary regions.

By the approach according to the invention it becomes possible to define in each of a succession of N cross-sections those boundary regions as critical regions, which by adjoining each other across the layer boundaries form a surface of the object, said surface needing to be manufactured with a high accuracy of details.

The selection of the critical regions (model subregions) may be made based on different criteria and will vary with the range of use of the object. According to the invention, not each contour region is automatically also a critical region, in which a solidification has to be carried out with high accuracy of details.

One criterion for the definition of a critical region can for example be the inclination of a surface: Inclined surfaces may be considered to be critical because due to the layer-wise manufacturing method there always are steps at the surface. Therefore, such an inclined surface would be defined as critical subregion in the CAD model of the object. The inclination of surfaces in the CAD model can be automatically recognized by a software. Therefore, inclined surfaces may be automatically recognized as critical regions, which critical regions are automatically assigned a distinct model subregion in the splitting operation. The same applies to an inner channel described in the first embodiment.

Another selection criterion for the definition of a critical region may be the mechanical workability of surfaces. In particular, when manufacturing tooling inserts, surfaces of the completed parts usually have to be subjected to a mechanical smooth finishing ("finishing" e.g. by means of milling). However, in particular small channels inside of the object may not be reached by milling. For these at best an elaborate processing by means of an electrical discharge machining is conceivable. Here, the present invention suggests considering these surface regions as distinct critical regions and solidifying these surface regions with a high accuracy of details.

A further selection criterion for the definition of critical regions may be a small size of inside cavities leading to the situation that the walls of the cavities have to be manufactured with high precision in order to avoid an unintended closing (filling) of the cavity.

Furthermore, a critical region may be a surface region having a high surface quality. A measure for the surface quality may for example be the mean roughness index that allows statements on the roughness.

Moreover, also subregions of the inner region may be critical regions, for example those areas of an object that are particularly delicate.

The selection of the critical regions may be made based on the above exemplarily given criteria. For example, curvatures of surfaces or diameters of cavities or bars may be identified in the individual object cross-sections by means of an algorithm and then the CAD model may be divided into model subregions automatically (by means of a computer program).

In order to illustrate a further embodiment of the invention, FIG. 3 shows a section of a small tooth cap such as an overlay or a crown, wherein the cross-section is perpendicular to the layers.

In the small tooth cap as shown the "pointed" ends 33 facing the gingiva only have a small diameter. After an integration of the small cap on a tooth stump these points are not accessible to a mechanical processing even at their outer surface 32 facing away from the tooth stump. The same applies to the surface 31 of the small cap facing the tooth stump. Also this surface can no longer be processed after an attachment of the cap. In contrast, the surface of the small tooth cap that faces away from the tooth stump can be abraded by the dentist after the mounting.

Under these circumstances, in this example of a method according to the invention the inner surface of the small tooth cap will be regarded as critical surface. Also that part of the outer surface of the small tooth cap, which can only be poorly processed after an integration of the small cap, meaning the outer surface 32 of the pointed ends 31, will be regarded as critical. Also in the case of small tooth caps the recognition of critical regions may be effected automatically. As soon as it has been defined for a sample what are the critical regions, a software is able to automatically identify such critical regions at the individual small tooth cap CAD models.

In the method of manufacturing the small tooth caps in accordance with the invention, the building material is applied in thin layers with a layer thickness of 10 µm and is solidified after the application of a layer only in critical surface regions. In all other subregions of the small tooth cap a solidification is effected only after the application of every second layer. With such an approach the manufacturing time can be remarkably reduced without having to make concessions in terms of the accuracy of details, which concessions will reduce the quality of the completed small tooth caps.

In the above-described automatic recognition of specific object geometries (e.g. position and shape of surface regions), a.o. one takes advantage of the fact that in the three-dimensional CAD model the contour and the internal regions of a cross-section may be distinguished. During the slicing by making use of a tessellation and a triangulation, respectively, which leads to the widely used STL format, polygons (usually triangles) in the boundary region and in the inner region can be easily distinguished. For example, a polygon having corners that are not at the same time corners of another polygon may be defined as polygon located in the contour.

Though the method according to the invention was described using the example of a laser sintering device, it may be applied in the same way in all other layer-wise manufacturing methods, in which the solidification is effected by means of electromagnetic radiation or by means of energetic particles (e.g. electrons). In particular, it is possible to direct the radiation for solidification onto the building material through masks with each of the masks being open in the area to be irradiated.

Furthermore, the approach according to the invention is not limited to powder as building material. Rather it is applicable also to a liquid building material, for example in stereolithography.

The invention claimed is:

1. Method for a layer-wise manufacturing of a three-dimensional object on the basis of a three-dimensional CAD model,
   wherein the method includes the following steps:
   modifying the three-dimensional CAD model of the object to be manufactured by dividing the model into three-dimensional model subregions,
   manufacturing the three-dimensional object by a layer-wise additive manufacturing method on the basis of the modified three-dimensional CAD model, wherein
   a building material in powder form or a liquid building material, being solidifiable by the action of electromagnetic radiation or energetic particle radiation, is applied in layers and the building material in each layer is solidified by irradiation with electromagnetic radiation or energetic particle radiation at those positions, which correspond to a cross-section in the modified CAD model assigned to this layer, wherein each cross-section consists of a contour region and an inner region, characterized in that
   there exists a cross-section that comprises a sub-cross-section assigned to a model subregion, wherein the sub-cross-section comprises a portion of the inner region as well as also a portion of the contour region, and
   there exist at least two sub-cross-sections in this cross-section, said sub-cross-sections being assigned to different model subregions, said model subregions including different portions of the contour region, wherein in said different model subregions the solidification of the building material is effected differently by choosing the respective irradiation parameters differently.

2. Method according to claim 1, in which critical regions of the object, in which the object has to be manufactured with a particularly high accuracy, are automatically assigned to one or more model subregions.

3. Method according to claim 2, in which a critical region is defined in that it satisfies at least one of the following criteria:

it is an outer or inner surface in the CAD model that corresponds to a surface of the object to be manufactured, which surface during the manufacturing of the object faces into a direction that is opposite to the direction, in which the layers are stacked onto each other;

it is an inner surface in the CAD model that corresponds to a boundary surface of a channel running inside of the object;

it is an outer or inner surface in the CAD model that corresponds to a surface of the object, which surface of the object cannot be reworked by a mechanical processing after the completion of the object.

4. Method according to claim 1, wherein a model subregion contains only a part of the inner region of the object.

5. Method according to claim 1, in which a building material in powder form is used and in which the electromagnetic radiation is supplied by means of a laser.

6. Method according to claim 1, in which the solidification in one model subregion is effected with a small beam focus and the solidification in another model subregion is effected with a large beam focus.

7. Method according to claim 1, in which in the solidification in one model subregion a radiation is used that has a lower energy density than the radiation used in the solidification in another model subregion.

8. Method for a layer-wise manufacturing of a three-dimensional object according to claim 1, the method including the following sub-step:
a number of N layers is consecutively applied, wherein N is an integer larger than 1 and wherein after each layer application a solidification is carried out in a part of the layer that is assigned to a first model subregion without a solidification in the part of the layer that is assigned to a second model subregion,
wherein after the application of the Nth layer a solidification of the building material is effected in all N layers simultaneously in the parts of the layers that are assigned to a second model subregion.

9. Method according to claim 8, in which the solidification in one model subregion is effected with a small beam focus and the solidification in another model subregion is effected with a large beam focus.

10. Method according to claim 8, in which in the solidification in one model subregion a radiation is used that has a lower energy density than the radiation used in the solidification in another model subregion.

11. Method according to claim 8, wherein a model subregion contains only a part of the inner region of the object.

12. Method according to claim 8, in which a building material in powder form is used and in which the electromagnetic radiation is supplied by means of a laser.

* * * * *